INVENTOR.
EDWARD D. DALL
BY
Barnes, Kisselle, Raisch & Choate
ATTORNEYS

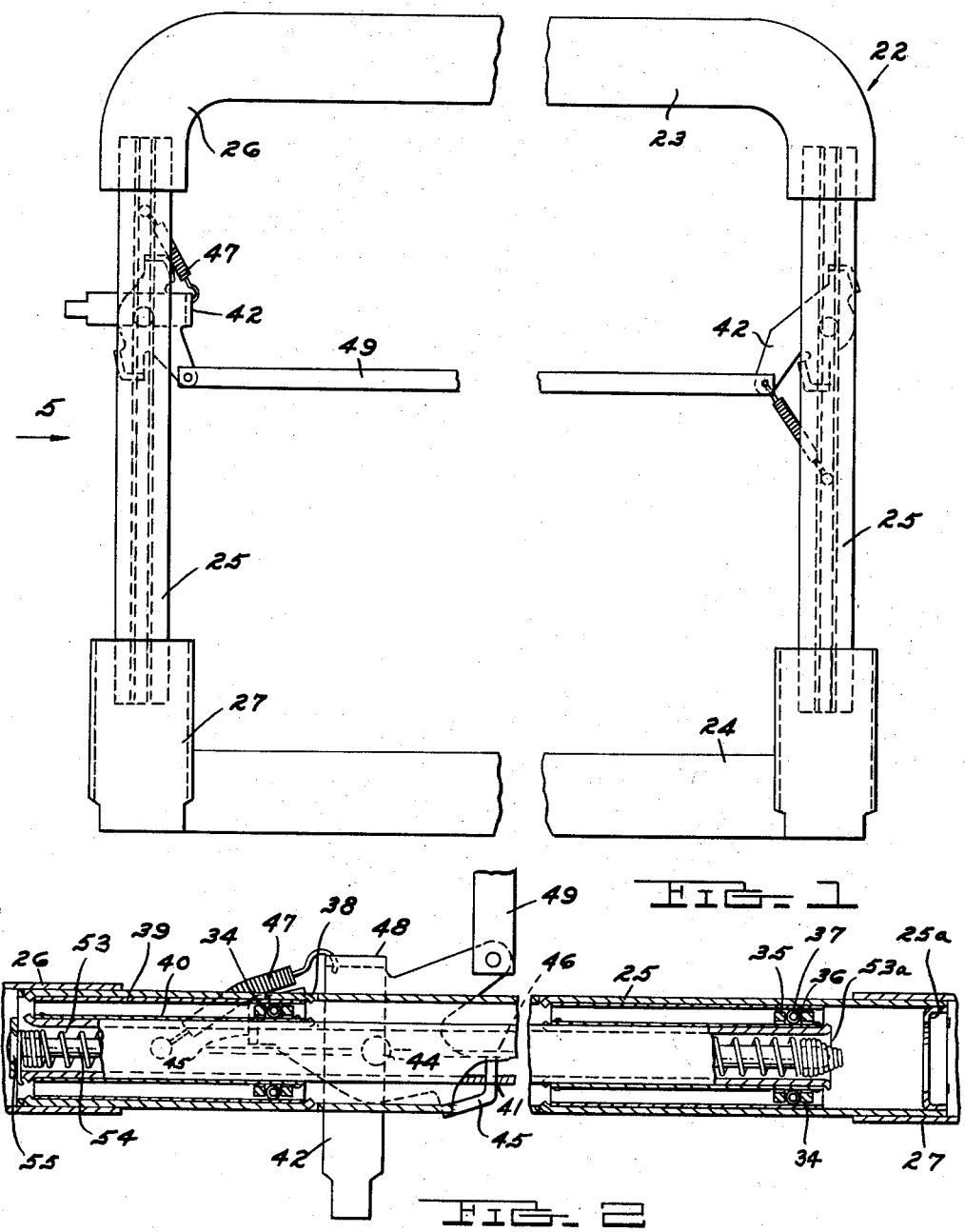
Sept. 8, 1964     E. D. DALL     3,147,947
ADJUSTABLE SEAT
Filed June 7, 1961     4 Sheets-Sheet 1
INVENTOR.
EDWARD D. DALL
BY
ATTORNEYS Sept. 8, 1964     E. D. DALL     3,147,947
ADJUSTABLE SEAT
Filed June 7, 1961     4 Sheets-Sheet 2
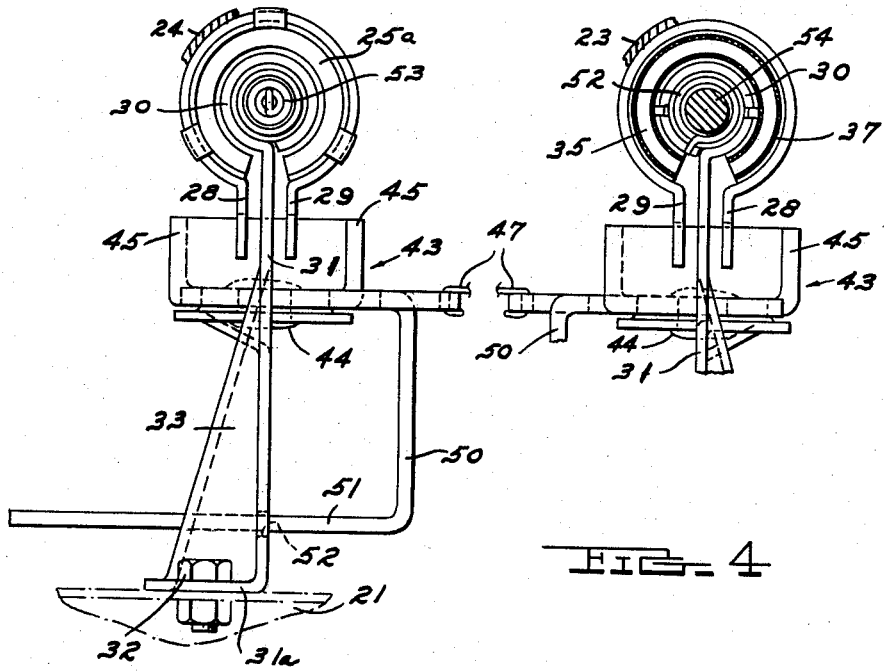
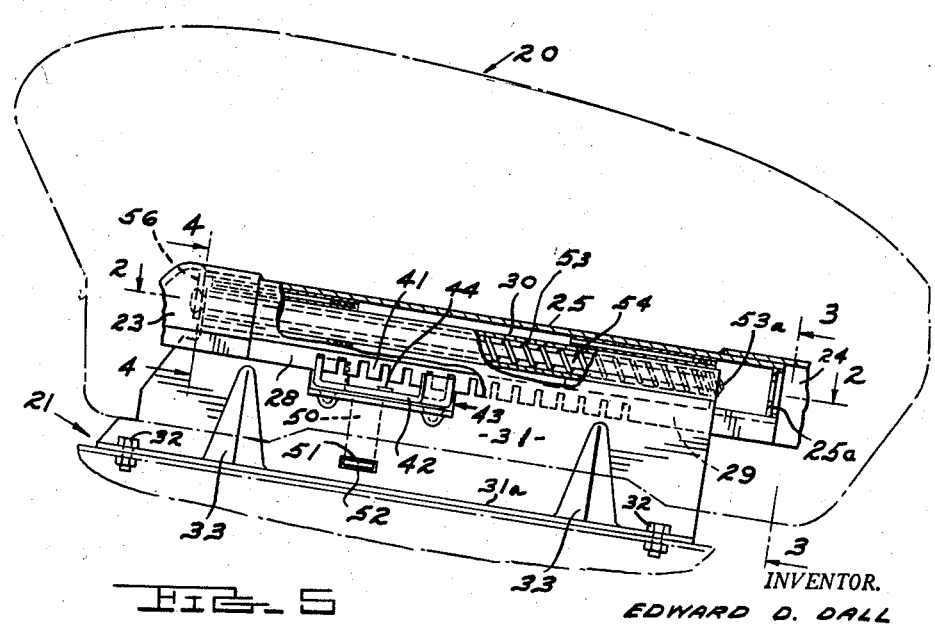
INVENTOR.
EDWARD D. DALL
BY
Barnes, Kisselle, Raisch & Choate
ATTORNEYS Sept. 8, 1964   E. D. DALL   3,147,947
ADJUSTABLE SEAT
Filed June 7, 1961   4 Sheets-Sheet 3

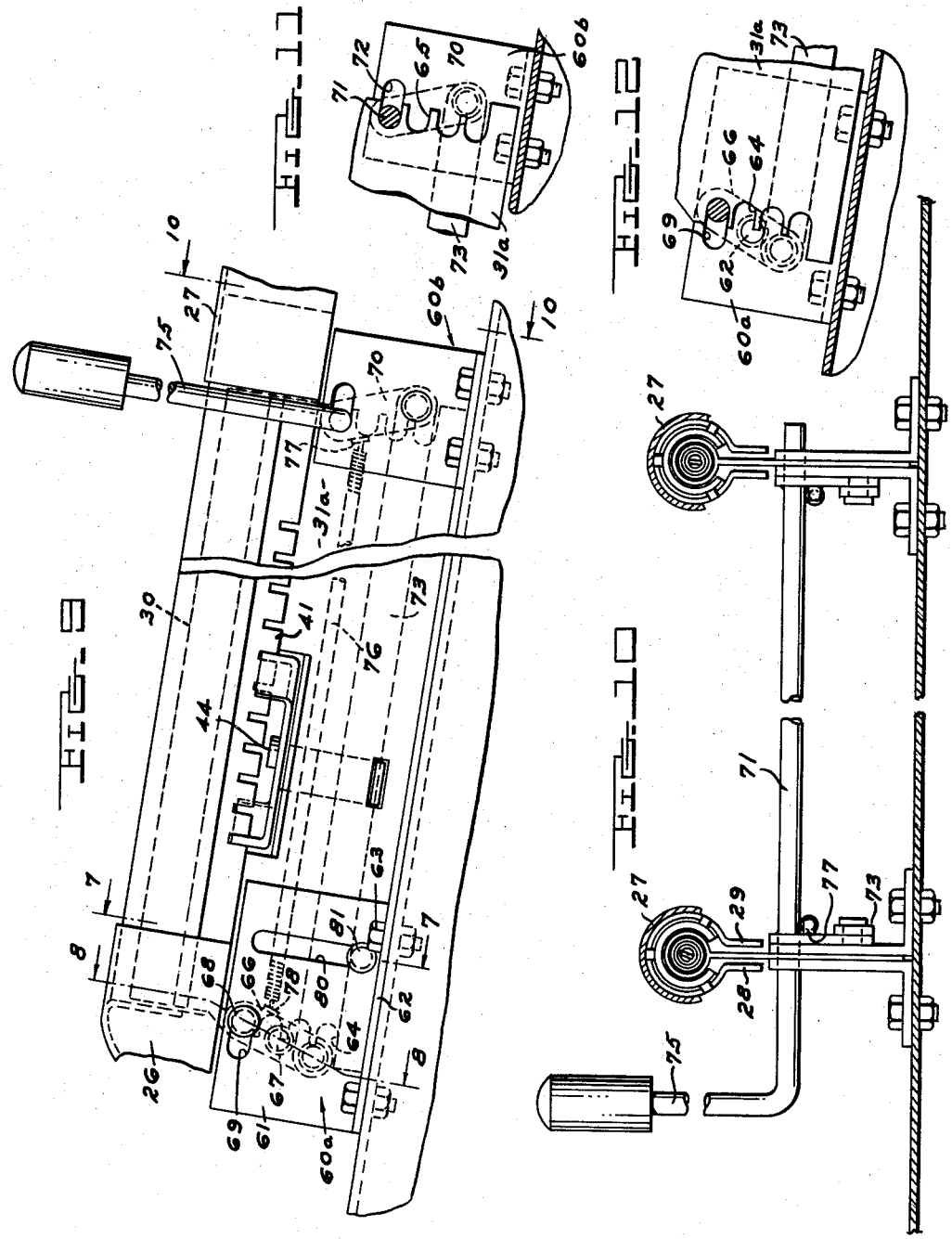

United States Patent Office 3,147,947
Patented Sept. 8, 1964

3,147,947
ADJUSTABLE SEAT
Edward D. Dall, 30370 Vernon Drive, Birmingham, Mich.
Filed June 7, 1961, Ser. No. 115,389
17 Claims. (Cl. 248—420)

This invention relates to adjustable seats and particularly to adjustable seats for automotive vehicles.

In my copending applications Serial No. 792,153, filed February 9, 1959, titled Seat Track Mechanism, issued November 7, 1961 as Patent 3,007,668 and Serial No. 38,304, filed June 23, 1960 and titled Seat Track Mechanism, there are disclosed and claimed novel seat track mechanisms which include means for adjusting the longitudinal position of the seat relative to the floor. Such mechanisms comprise a generally tubular support mounted on the floor of the vehicle, a complementary tubular carriage mounted on the underside of the seat and having a surface surrounding a portion of the surface of the tubular support and roller bearing means comprising a tightly wound helical wire spring interposed between the surfaces of longitudinally spaced points. Guide means are movable longitudinally with each roller bearing means independently of the carriage and the support for retaining the roller bearing means in longitudinally spaced relation and relative transfer position with the longitudinal axis of the tubular support. In application Serial No. 38,304, the seat track mechanism includes, in addition, a mechanism for up and down adjustment of one end of the seat.

It is an object of this invention to provide an improved adjustable seat construction which reduces the height of the seat permitting its use in installations where there is low head room in the vehicle.

It is a further object of the invention to provide such an adjustable seat which has a minimum number of parts.

It is a further object of the invention to provide such a seat which permits up and down adjustment of both the front and rear of the vehicle seat.

In the drawings:

FIG. 1 is a fragmentary plan view of a seat embodying the invention, parts being broken away and parts being shown in broken lines.

FIG. 2 is a fragmentary sectional view taken along the line 2—2 in FIG. 5.

FIG. 3 is a sectional view taken along the line 3—3 in FIG. 5.

FIG. 4 is a fragmentary sectional view taken along the line 4—4 in FIG. 5.

FIG. 5 is a fragmentary side elevation, parts being broken away, taken in the direction of the arrow shown in FIG. 1.

FIG. 9 is a fragmentary side elevation taken along the line 9—9 in FIG. 6.

FIG. 10 is a fragmentary sectional view taken along the line 10—10 in FIG. 9.

FIG. 11 is a sectional view taken along the line 11—11 in FIG. 8.

FIG. 12 is a sectional view taken along the line 12—12 in FIG. 7.

Figure 6:
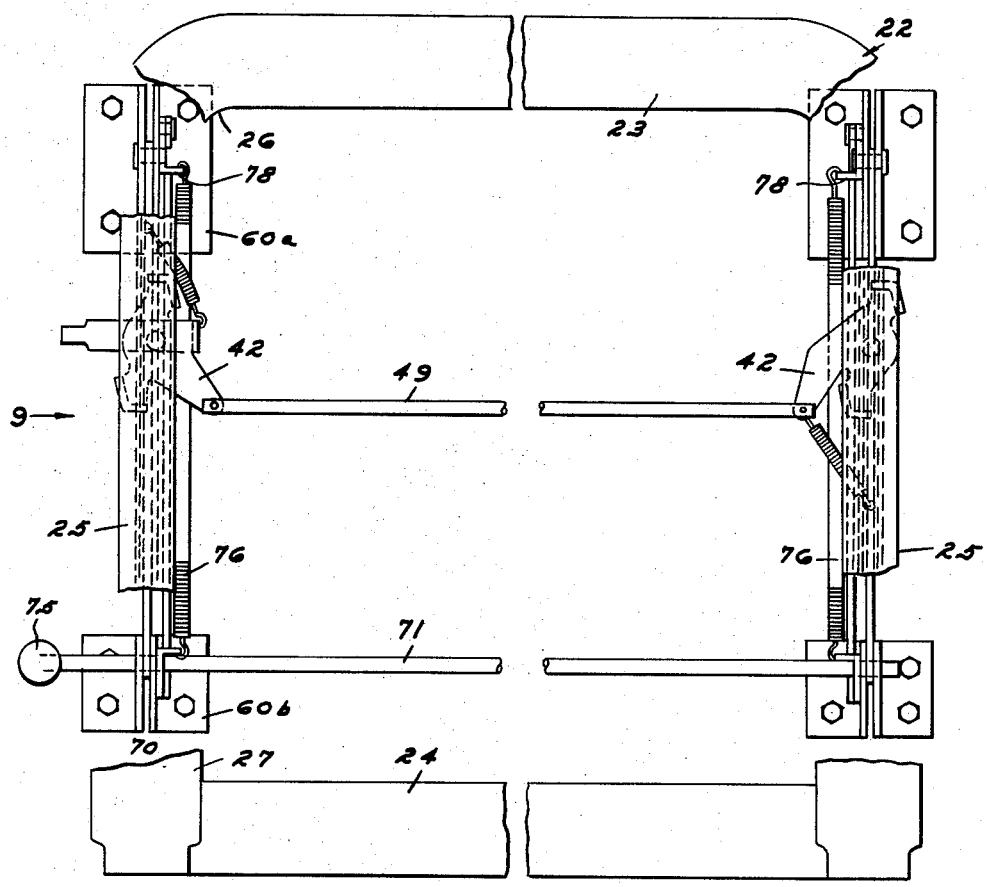
FIG. 6 is a fragmentary plan view, parts being broken away and parts being shown in broken lines, of a further modified form of the invention.

Referring to FIGS. 1 and 5, the invention relates to a seat 20 that is mounted adjustably on the floor 21 of a vehicle or the like. Seat 20 comprises a frame 22 that supports sinuous or coil springs which are padded and otherwise upholstered to form the complete seat.

As shown in FIG. 1, the frame 22 comprises a front rail 23, a rear rail 24, and side rails 25 joining the ends of the front and rear rails 23, 24.

According to the invention, the side rails 25 form an integral part of the seat adjusting mechanism. As shown in FIGS. 2 and 5, each side rail 25 is generally tubular and has the ends thereof fastened as by welding to the brackets 26, 27 on the ends of the front rail 22 and rear rail 24. When the front and rear rails 23, 24 are made of tubular material, they can be bent at their ends to receive telescopically the ends of the tubular side rails 25. Each side rail 25 comprises a split tube including downwardly extending integral flanges 28, 29. Each side rail 25 is telescoped over a tubular support 30 formed integrally with the upper end of a web 31 which extends between the flanges 28, 29. As shown in FIGS. 3 and 5, the lower end of the web is bent laterally as at 31a and is bolted to the floor 21 by bolts 32. At longitudinally spaced points, web 31 is formed with ribs 33 which strengthen the web.

As shown in FIGS. 2 and 5, roller bearing assemblies 34 are provided at longitudinally spaced points between the inner surface of side rail 25 and the outer surface of tubular support 30. Roller bearing assemblies 34 may be of the type shown in the aforementioned prior applications Serial Nos. 792,153 and 38,304. As shown in FIG. 2, each roller bearing assembly comprises a generally rectangular sheet member 35 which is bent to form a cylinder with the ends thereof adjacent the web 41 and having a slot 36 therein in which the tightly wound helical spring 37 is positioned to provide the roller bearing. The arrangement is such that when the side rails 25 are moved longitudinally of the tubular support 30, the coil springs 37 roll providing the bearing between the side rails 25 and supports 30. Stops in the form of tabs 38 are provided at longitudinally spaced points on the side rails 25 and supports 30 to limit the movement of the bearing assemblies 34. In addition, in order to permit the use of less expensive materials for the rails 25 and supports 30, hardened inserts 39, 40 are provided on the surfaces of the rails 25 and supports 30 in the area in which the coil springs 37 roll.

As shown in FIG. 5, each flange 28, 29 is provided with a plurality of longitudinally spaced downwardly extending teeth 41 and a latch 42 is pivoted on tabs 43 bent outwardly from the web 31 to selectively engage the teeth. As shown in FIGS. 3 and 5, latch 42 is generally flat and is pivoted to the tabs 43 by a rivet 44. The latch includes upwardly extending ears 45 at each end thereof, the ear on one end being adapted to engage the teeth on flange 28 while the ear on the other end is adapted to engage the teeth on flange 29. In this manner, a double latching or locking of the side rail 25 is achieved. As shown in FIG. 2, each ear 45 is at a generally right angle to the plane of latch 42 and includes an inwardly extending lip 46. One end of a tension spring 47 is connected to an upwardly turned tab 48 on the latch 42 and the other end thereof is fixed to the web 31.

As shown in FIG. 1, the latch 42 on one side of the seat is interconnected to the latch 42 on the other side of the seat by a link 49. The latch 42 on the driver's side of the seat is formed with a downwardly extending arm 50 that has an outwardly bent portion 51 extending through an opening 52 in the web 31 to provide a handle so that the latch 42 can easily be pivoted and, in turn, pivot the latch on the other side of the seat out of engagement (FIGs. 3, 5).

In order to facilitate the adjustment of the seat, a coil spring 53 is provided within each tubular support 30 and has the forward end thereof fixed to the forward end of tube 30 and the rear end thereof closed as at 53. A rod 54 has one end thereof fixed to the frame 22 as by welding to a flange 56 on the bracket 26 of the frame. Rod 54 extends within the coil spring 52. When the seat is moved rearwardly, the rear end of the rod 54 engages the closed end 53a of the spring tensioning the spring. When the latch is released, the spring tends to push the rod 54 and, in turn, the seat forwardly.

In order to facilitate assembly of the seat track mechanism, the tabs 38 on tubular rail 25 adjacent the rear end of the tubular rail 25 are omitted. The support 30 with the bearings thereon can then be inserted by telescoping within the tubular rail. A clip 25a having outwardly extending prongs 25b that engage the tubular rail is then placed in position to serve as a rearward limiting means for the adjacent roller bearing assembly.

It can thus be seen that the provision of making the rails 25 part of the seat frame contribute in making the overall seat of lesser height. In addition, the latch mechanisms provide a double locking of each side rail. The provision of the latch on the web rather than on the seat results in a construction wherein the latch does not move with the seat thereby obviating any difficulty of entanglement of the latch with the clothes of the wearer or any part of the vehicle.

The form of the invention shown in FIGS. 6 to 12 is similar to that shown in FIGS. 1 to 5 and includes, in addition, an up and down adjustment of both the forward and rear ends of the seat. Specifically, as shown in FIGS. 7, 8, 9 and 10, web 31a which is integral with tubular support 30 is mounted for vertical movement between brackets 60a, 60b mounted adjacent the front and rear ends of the web 31a. Each bracket 60 comprises a vertical portion 61 and a horizontal portion 62 which is fixed to the floor of the vehicle by bolts 63.

Figure 7:
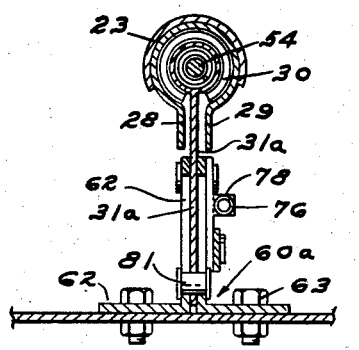
FIG. 7 is a fragmentary sectional view taken along the line 7—7 in FIG. 9.
Figure 8:
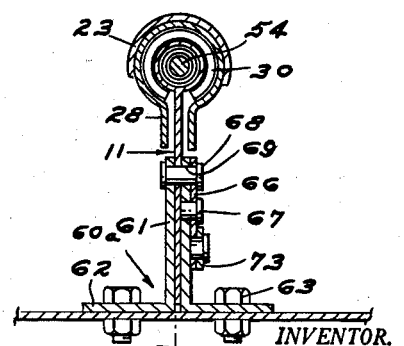
FIG. 8 is a fragmentary sectional view taken along the line 8—8 in FIG. 9.

As shown in FIGS. 9 and 12, the forward edge of web 31a is formed with vertically spaced notches 64. As shown in FIGS. 9 and 11, the rear edge of the web 31a is formed with vertically spaced notches 65. A latch 66 in the form of a link is pivoted intermediate its ends by a rivet 67 to a vertical portion 61 of front bracket 60a (FIG. 7). Latch 66 includes a pin 68 at the upper end thereof which extends through aligned longitudinally elongated openings 69 so that when the upper end of the latch 66 is pivoted rearwardly pin 68 selectively engages one of the notches 64 and when the upper end of the latch 66 is moved forwardly, the pin 68 disengages from one of the notches 64.

A second latch 70 is positioned adjacent the one vertical portion 61 of bracket 60b adjacent the rear edge of the web 31a and includes a pin 71 that extends through aligned elongated openings 72 in the vertical portion 61 of the rear bracket 60b. When the latch is moved to bring the pin 71 forwardly, the pin 71 engages selectively one of the notches 65 in the rear edge of web 31a and when the latch is moved to bring the pin 71 rearwardly relative to the opening 72, the pin 71 is disengaged from the notches.

The lower end of latch 66 is connected to the lower end of latch 70 by a link 73 that is pivoted to the lower ends of the latches. The pins 71 on each side of seat 20 comprise portions of a single rod extending between the latches 70 on each side of the seat and welded thereto. A handle 75 is bent upwardly from the end of the rod 71 which is adjacent the driver. A tension spring 76 extends between a tab 77 bent outwardly from link 70 and a tab 78 bent outwardly from link 66 at the front of the web 31a above the pivot 67 of latch 66 on each side of the seat.

When the handle 75 is swung forwardly, the rod 71 remains in engagement with the notches 65 and the lower end of the latch 70 through link 73 swings the lower end of the latch 66 rearwardly pivoting the latch about rivet 67 to swing the upper end of the latch 66 and, in turn, the pin 68 out of engagement with the notch 64. This permits the front end of the seat to be adjusted upwardly with the rod 71 forming the hinge or pivot point. A similar action occurs on the other side of the seat by the single manipulation of rod 71.

In order to guide the movement of the seat, the vertical portions 61 of the bracket 60a at the forward end of the seat are provided with aligned vertical slots 80 and a pin 81 on web 31a extends through the slots and guides the movement of the seat.

When the handle 75 is swung rearwardly again to the vertical position, the upper end of the latch 66 and, in turn, the pin 68 is moved into engagement with another notch 64.

When the handle 75 is swung rearwardly, the rod 71 is also moved rearwardly moving the rod out of engagement with one of the notches 65. The pins 68 on latch 66 remain in engagement with the notch 64 at the front end of the seat. The rear end of the seat can then be adjusted vertically up and down and when the handle 75 is again moved forwardly to vertical position, it engages one of the notches 65 to lock the rear of the seat in vertically adjusted position.

It can thus be seen that there has been provided a seat construction which is low in height, provides a position lock, and permits vertical adjustment of the front and rear ends of the seat.

This application is a continuation-in-part of applications Serial No. 792,153, filed February 9, 1959, titled Seat Track Mechanism and Serial No. 38,304, filed June 23, 1960 and titled Seat Track Mechanism.

I claim:

1. The combination comprising a seat having a front rail, a rear rail spaced from the front rail and side rails joining the ends of said front and rear rails, each said side rail being substantially tubular, a tubular support adapted to be fixed to the floor of a vehicle or the like adjacent each said side rail, each said side rail being telescoped over its respective support, roller bearing means interposed between the surfaces of said tubular support and said side rail at longitudinally spaced points along said side rail, interengaging means between each said side rail and its respective support for locking said side rail in longitudinally spaced relation to said support, a base, and means for supporting said tubular support on said base comprising a plurality of vertically spaced teeth at each end of said support, the teeth at one end facing oppositely to the teeth at the other, a first latch pivoted about a horizontal axis intermediate its ends to one end of said base, one end of said first latch being adapted to engage the teeth on said support at said end, a second latch adapted to engage the teeth at the other end of said support, means for pivoting said second latch to said base, said pivot being horizontal and having longitudinal movement relative to said base, a link connecting the other end of said first latch to said second latch, and a handle on one of said latches whereby when the handle is moved in one direction one of said latches is caused to disengage its respective teeth and when the handle is moved in the opposite direction the other of the latches is caused to disengage its respective teeth.

2. The combination set forth in claim 1 wherein each said latch has a pin thereon adapted to selectively engage the teeth, said base having openings elongated longitudinally thereof into which said pin extends.

3. The combination set forth in claim 2 including a spring interconnecting one of said latches and said base for urging said latches into engagement with said teeth.

4. The combination comprising a seat, a support adapted to be fixed to the floor of a vehicle or the like adjacent each said side of said seat, bearing means interposed between the surfaces of said support and said seat, and interengaging means between each said seat and said support for locking said seat in longitudinally spaced relation to said support, a base, and means for supporting said tubular support on said base comprising a plurality of vertically spaced teeth at each end of said support, the teeth at one end facing oppositely to the teeth at the other, a first latch pivoted about a horizontal axis intermediate its ends to one end of said base, one end of said first latch being adapted to engage the teeth on said support at said end, a second latch adapted to engage the teeth at the other end of said support, means for pivoting said second latch to said base, said pivot having longitudinal movement relative to said base, and a link connecting the other of said first latch to said second latch, and a handle on one of said latches whereby when the handle is moved in one direction one of said latches is caused to disengage its respective teeth and when the handle is moved in the opposite direction the other of the latches is caused to disengage its respective teeth.

5. The combination set forth in claim 4 wherein each said latch has a pin thereon adapted to selectively engage the teeth, said base having openings elongated longitudinally thereof into which said pin extends.

6. The combination set forth in claim 5 including a spring interconnecting said latches for urging said latches into engagement with said teeth.

7. The combination comprising a seat, a front rail, a rear rail spaced from the front rail and side rails joining the ends of said front and rear rails, a support adapted to be fixed to the floor of a vehicle or the like adjacent each side of said seat, each said side rail being telescoped over its respective support, roller bearing means interposed between the surfaces of said tubular support and said side rail at longitudinally spaced points along said side rail, and interengaging means between each said side rail and its resepctive support for locking said side rail in longitudinally spaced relation to said support, each said tubular support including a downwardly extending web, a plurality of vertically spaced teeth on each end of said web, a base including an upwardly extending support adjacent each end of said web, a first latch pivoted about a horizontal axis intermediate its ends to said support, said first latch having a pin in the upper end thereof, a slot in said support through which said pin extends, said pin being adapted to selectively engage the teeth on the front end of said web, a second latch at the rear end of said web, said second latch having a pin, said support having a slot through which said pin extends, said pin being adapted to selectively engage the teeth at the rear end of said support, and a rigid link pivoted to and interconnecting the lower ends of said latches, whereby when said second latch is swung rearwardly about its pivot, said first latch is caused to swing and disengage the pin with said first row of teeth on the forward end of the web and when said second latch is moved rearwardly it is caused to disengage from its respective teeth and swings said first latch about its pivot.

8. The combination set forth in claim 7 wherein the pins on the second latches at each side of the seat comprise portions of a single rod extending transversely of the seat.

9. The combination comprising a seat, a support adapted to be fixed to the floor of a vehicle or the like adjacent each said side of said seat, bearing means interposed between the surfaces of said support and said seat, and interengaging means between each said seat and said support for locking said seat in longitudinally spaced relation to said support, each said tubular support including a downwardly extending web, a plurality of vertically spaced teeth on each end of said web, a base including an upwardly extending support adjacent each end of said web, a first latch pivoted about a horizontal axis intermediate its ends to said support, said first latch having a pin in the upper end thereof, a slot in said support through which said pin extends, said pin being adapted to selectively engage the teeth on the front end of said web, a second latch at the rear end of said web, said second latch having a pin, said support having a slot through which said pin extends, said pin being adapted to selectively engage the teeth of the rear end of said support, and a rigid link pivoted to and interconnecting the lower ends of said latches, whereby when said second latch is swung rearwardly about its pivot, said first latch is caused to swing and disengage the pin with said first row of teeth on the forward end of the web and when said second latch is moved rearwardly it is caused to disengage from its respective teeth and swings said first latch about its pivot.

10. The combination comprising a seat having a front rail, a rear rail spaced from the front rail and side rails joining the ends of said front and rear rails, each said side rail being substantially tubular, a tubular support adapted to be fixed to the floor of a vehicle or the like adjacent each said side rail, each said side rail being telescoped over its respective support, roller bearing means interposed between the surfaces of said tubular support and said side rail at longitudinally spaced points along said side rail, interengaging means between each said side rail and its respective support for locking said side rail in longitudinally spaced relation to said support, a base, and means for supporting said tubular support on said base comprising a plurality of vertically spaced teeth at each end of said support, a first latch pivoted about a horizontal axis intermediate its ends to one end of said base, one end of said first latch being adapted to engage the teeth on said support at said end, a second latch adapted to engage the teeth at the other end of said support, means for pivoting said second latch to said base, said pivot being horizontal and having longitudinal movement relative to said base, a link connecting the other end of said first latch to said second latch, and a handle on one of said latches whereby when the handle is moved in one direction one of said latches is caused to disengage its respective teeth and when the handle is moved in the opposite direction the other of the latches is caused to disengage its respective teeth.

11. The combination comprising a seat having a base frame comprising a front structural rail, a rear structural rail spaced from the front rail and side structural rails joining the ends of said front and rear rails, each said side rail being substantially tubular, a tubular support adapted to be fixed to the floor of a vehicle or the like adjacent each said side rail, each said side rail being telescoped over its respective support, roller bearing means interposed between the surfaces of said tubular support and said side rail at longitudinally spaced points along said side rail, interengaging means between each said side rail and its respective support for locking said side rail in longitudinally spaced relation to said support, and a coil spring interposed in said tubular support, said spring having one end thereof fixed to said support, the other end of said spring being closed, a rod fixed to said seat and extending within said coil spring, the end of said rod engaging the closed end of the spring for yieldingly urging said seat in one direction relative to said support.

12. The combination comprising a seat having a base frame comprising a front structural rail, a rear structural rail spaced from the front rail and side structural rails joining the ends of said front and rear rails, each said side rail being substantially tubular, a tubular support adapted to be fixed to the floor of a vehicle or the like adjacent each said side rail, each said side rail being telescoped over its respective support, roller bearing means interposed between the surfaces of said tubular support and said side rail at longitudinally spaced points along said side rail, guide means for each said roller bearing means movable with said roller bearing means independently of said side rail and said support, each said guide means maintaining its respective roller bearing means in transverse relation to said side rail and said support, each said side rail including an integral downwardly extending flange having a plurality of longitudinally spaced teeth thereon, and a latch pivoted to said base and adapted to selectively engage said teeth for locking said side rail in predetermined longitudinal position on said tubular support, and a coil spring positioned in each said tubular support and having the end thereof nearest the front rail fixed to said tubular support and the other end thereof closed, a rod fixed to said seat adjacent the front rail and extending into said coil, the rear end of said rod being adapted to engage the closed end of said spring for yieldingly urging the seat frame forwardly.

13. The combination comprising a seat including a frame having a front structural rail, a rear structural rail spaced from the front rail, and side structural rails, each said side rail being substantially tubular, each said side rail being split longitudinally substantially on its underside to form a slot, means joining one end of each said side rail to the front rail, means joining the other end of each said side rail to the rear rail, said means joining the ends of said side rails to said front and rear rails including means for restraining the tendency of the split end portions of the side rails to open under load, a tubular support, means connected to the said tubular support extending through said slot and adapted to be fixed to the floor of a vehicle, each said side rail being telescoped over its respective support, bearing means interposed between the surfaces of said tubular support and said side rail at longitudinally spaced points along said side rail, and means interengaging said support and said side rail to lock said side rail in predetermined longitudinal position on said support.

14. The combination set forth in claim 13 wherein said means extending through said slot comprises a web extending substantially downwardly through said slot.

15. The combination set forth in claim 13 wherein said interengaging means comprises a latch pivoted to said tubular support, said tubular support having a pair of lips having longitudinally spaced teeth thereon, said latch engaging selective pairs of said teeth on said lips.

16. The combination comprising a seat including a frame having a front structural rail, a rear structural rail spaced from the front rail, and side structural rails, each said side rail being substantially tubular, each said side rail being split longitudinally substantially on its underside to form a slot, means joining one end of each said side rail to the front rail, means joining the other end of each said side rail to the rear rail, said means joining the ends of said side rails to said front and rear rails including means for restraining the tendency of the split end portions of the side rails to open under load, a tubular support including a web extending substantially downwardly from said support through said slot and adapted to be fixed to the floor of a vehicle, each said side rail being telescoped over its respective support, roller bearing means interposed between the surfaces of said tubular support and said side rail at longitudinally spaced points along said side rail, guide means for each said roller bearing means movable with said roller bearing means independently of said side rail and said support, each said guide means maintaining its respective roller bearing means in transverse relation to said side rail and said support, and interengaging means between said support and said side rail to lock said side rail in predetermined longitudinal position on said support.

17. The combination set forth in claim 16 including a hardened tubular sleeve between the roller bearing means and one of said side rails and said support.

References Cited in the file of this patent

UNITED STATES PATENTS

| | | |
|---|---|---|
| 1,158,953 | Andersen | Nov. 2, 1915 |
| 1,525,114 | Yoscary | Feb. 3, 1925 |
| 2,134,135 | Le Fevre | Oct. 25, 1938 |
| 2,827,106 | Cramer | Mar. 18, 1958 |
| 3,007,668 | Dall | Nov. 7, 1961 |
| 3,037,736 | James | June 5, 1962 |

FOREIGN PATENTS

| | | |
|---|---|---|
| 127,453 | Australia | Apr. 14, 1948 |